(12) United States Patent
Malfroy et al.

(10) Patent No.: US 12,090,695 B2
(45) Date of Patent: Sep. 17, 2024

(54) SYSTEM FOR MANUFACTURING POLYMER PARTS BY INJECTION AND ASSOCIATED METHOD

(71) Applicant: Groupe JBT, Molinges (FR)

(72) Inventors: Dominique Malfroy, Longchaumois (FR); Laurent Lavina, Thoiria (FR); Philippe Janod, Vescles (FR); Rémy Michaud, Pratz (FR)

(73) Assignee: Groupe JBT (FR)

( * ) Notice: Subject to any disclaimer, the term of this patent is extended or adjusted under 35 U.S.C. 154(b) by 469 days.

(21) Appl. No.: 16/980,649

(22) PCT Filed: Mar. 14, 2019

(86) PCT No.: PCT/EP2019/056508
§ 371 (c)(1),
(2) Date: Sep. 14, 2020

(87) PCT Pub. No.: WO2019/175361
PCT Pub. Date: Sep. 19, 2019

(65) Prior Publication Data
US 2021/0016483 A1 Jan. 21, 2021

(30) Foreign Application Priority Data
Mar. 14, 2018 (FR) ...................................... 1852207

(51) Int. Cl.
*B29C 45/33* (2006.01)
*B29C 45/07* (2006.01)
(Continued)

(52) U.S. Cl.
CPC .......... *B29C 45/7207* (2013.01); *B29C 45/07* (2013.01); *B29C 45/261* (2013.01);
(Continued)

(58) Field of Classification Search
CPC ....... B29C 45/26; B29C 45/37; B29C 45/401; B29C 45/586; B29C 33/02; B29C 2045/7343; B29C 2045/4089
See application file for complete search history.

(56) References Cited

U.S. PATENT DOCUMENTS 3,396,431 A 8/1968 Kovach et al.
3,981,662 A 9/1976 Bielfeldt et al.
(Continued)

FOREIGN PATENT DOCUMENTS

FR 1194138 A 11/1959
FR 1431996 A 3/1966
(Continued)

OTHER PUBLICATIONS

French Search Report for Application No. FR1852207, dated Oct. 25, 2018, pp. 1-2.
(Continued)

*Primary Examiner* — Thu Khanh T. Nguyen
(74) *Attorney, Agent, or Firm* — Lerner David LLP (57) ABSTRACT

The invention relates to a system for manufacturing polymer parts, comprising: a material-injection portion, a mould movable between at least one open position and a closed position, the mould comprising an outer mould portion, wherein the injection portion is suitable for injecting material into the closed mould so as to form at least one part when the injection portion is connected to the closed mould, and wherein the system is suitable for moving the injection portion relative to the mould after injection, the outer portion being kept in contact with the part formed by injection in order to cool the part during the movement of the injection portion.

10 Claims, 7 Drawing Sheets

(51) Int. Cl.
*B29C 45/26* (2006.01)
*B29C 45/72* (2006.01)
*B29C 45/00* (2006.01)
*B29C 45/40* (2006.01)
*B29C 45/73* (2006.01)

(52) U.S. Cl.
CPC .......... *B29C 45/2628* (2013.01); *B29C 45/33* (2013.01); *B29C 2045/0094* (2013.01); *B29C 2045/4089* (2013.01); *B29C 2045/7343* (2013.01)

(56) References Cited

U.S. PATENT DOCUMENTS

| | | | | |
|---|---|---|---|---|
| 4,352,652 | A * | 10/1982 | Barber | B29C 45/2612 |
| | | | | 425/525 |
| 4,756,865 | A * | 7/1988 | von Holdt | B29C 45/33 |
| | | | | 264/336 |
| 6,569,370 | B1 * | 5/2003 | Amin | B29C 45/26 |
| | | | | 264/537 |
| 2009/0068307 | A1 * | 3/2009 | McCready | B29C 45/7312 |
| | | | | 425/552 |
| 2009/0267256 | A1 * | 10/2009 | Arai | B29C 43/18 |
| | | | | 425/542 |
| 2012/0074616 | A1 * | 3/2012 | Halter | B29C 45/40 |
| | | | | 264/297.1 |
| 2014/0212610 | A1 * | 7/2014 | Arai | B29C 44/0415 |
| | | | | 428/36.5 |

FOREIGN PATENT DOCUMENTS

| | | |
|---|---|---|
| FR | 2120867 A5 | 8/1972 |
| FR | 3048633 A1 | 9/2017 |
| GB | 1078552 A | 8/1967 |
| JP | S60159018 A | 8/1985 |
| WO | 9211989 A1 | 7/1992 |
| WO | 2017023959 A1 | 2/2017 |

OTHER PUBLICATIONS

International Search Report for Application No. PCT/EP2019/056508, mailed May 23, 2019, pp. 1-2.

* cited by examiner

SYSTEM FOR MANUFACTURING POLYMER PARTS BY INJECTION AND ASSOCIATED METHOD

CROSS-REFERENCE TO RELATED APPLICATIONS

The present application is a national phase entry under 35 U.S.C. § 371 of International Application No. PCT/EP2019/056508, filed Mar. 14, 2019, which claims priority from French Patent Application No. 1852207, filed Mar. 14, 2018, all of which are incorporated herein by reference.

TECHNICAL FIELD

It is about the technical field of manufacturing polymer parts by injection.

STATE OF PRIOR ART

Methods for manufacturing polymer parts by injection are known. These methods comprise a phase of hot injecting material into a mould, a cooling phase in the cooled mould, and a part ejection phase by opening the mould.

These methods are commonly used for small size and small thickness parts, since such dimensions enable implementation of short cycles, simultaneous manufacture of several parts in moulds with several cavities, and therefore a high productivity.

However, it would be desirable to be able to further improve productivity of known systems, especially by reducing time between initiation of two consecutive cycles, without increasing defects among parts produced.

DISCLOSURE

One purpose of the invention is to overcome at least one of the drawbacks set forth above.

To this end, it is provided a system for manufacturing polymer parts comprising:
  a material injection portion,
  a mould movable between at least an open position and a closed position, the mould comprising a mould outer portion,
  wherein the injection portion is suitable to inject material into the closed mould so as to form at least one part when the injection portion is connected to the closed mould, and
  wherein the system is suitable to move the injection portion relative to the mould after injection, the outer portion being held in contact with the injection-formed part to cool the part upon moving the injection portion.

The invention is advantageously completed by the following characteristics, taken individually or in any of technically possible combinations thereof:
  the mould remains closed upon moving the injection portion,
  the mould comprises a mould inner portion, the inner portion being held in contact with the injection-formed part to cool the part when the mould remains closed upon moving the injection portion.

The invention also relates to a method for manufacturing polymer parts implemented by means of such a system, the method comprising the following steps of:
  injecting material by the injection portion into the closed mould so as to form at least one part, the injection portion being connected to the closed mould,
  after injecting, moving the injection portion relative to the mould, the outer portion being held in contact with the injection-formed part to cool the part upon moving the injection portion.

The invention is advantageously completed by the following characteristics, taken individually or in any technically possible combinations thereof:
  the mould remains closed upon moving the injection portion,
  the mould comprises a step of opening the mould, comprising:
    releasing an inner portion of the mould, so as to enable the inner portion to be cooled, and
    releasing the outer portion,
  releasing the outer portion beginning at the same time or subsequently to releasing the inner portion,
  releasing the outer portion begins subsequently to releasing the inner portion, so as to enable the inner portion to be cooled while the part continues to be cooled by the outer portion,
  a step of ejecting the part subsequently to releasing the inner portion and releasing the outer portion, ejecting taking place by pressing an ejection portion of the system against a thickness of the part,
  releasing the outer portion is slower than releasing the inner portion.

DRAWINGS

Further objects, characteristics and advantages will appear upon reading the following description given by way of illustrating and in no way limiting purposes, among which.

DESCRIPTION

General Structure of the System

With reference to the figures, a system 1 for manufacturing polymer parts is described. The system 1 is for example a very large scale manufacturing system.

By very large series, it is meant for example a manufacturing system having a cycle time lower than 10 seconds, each cycle time corresponding to the simultaneous manufacture of several parts and enabling series of at least 1 million parts to be manufactured per year.

The system 1 comprises a material injection portion 11. The injection portion comprises or is for example an injector. The injector can comprise a plasticising unit, the plasticising unit for example comprises a worm screw for melting material and/or a cylinder for injecting material. The material is for example a plasticised and/or molten and/or pressurised material. The injection portion for example comprises a worm screw suitable to circulate material beads.

The system can comprise several such injection portions 11.

The system comprises a mould 13. The mould can be movable between at least an open position and a closed position. The mould 13 can comprise an outer portion.

The system can comprise several such moulds 13.

The system can comprise a control unit 17.

Figure 1:
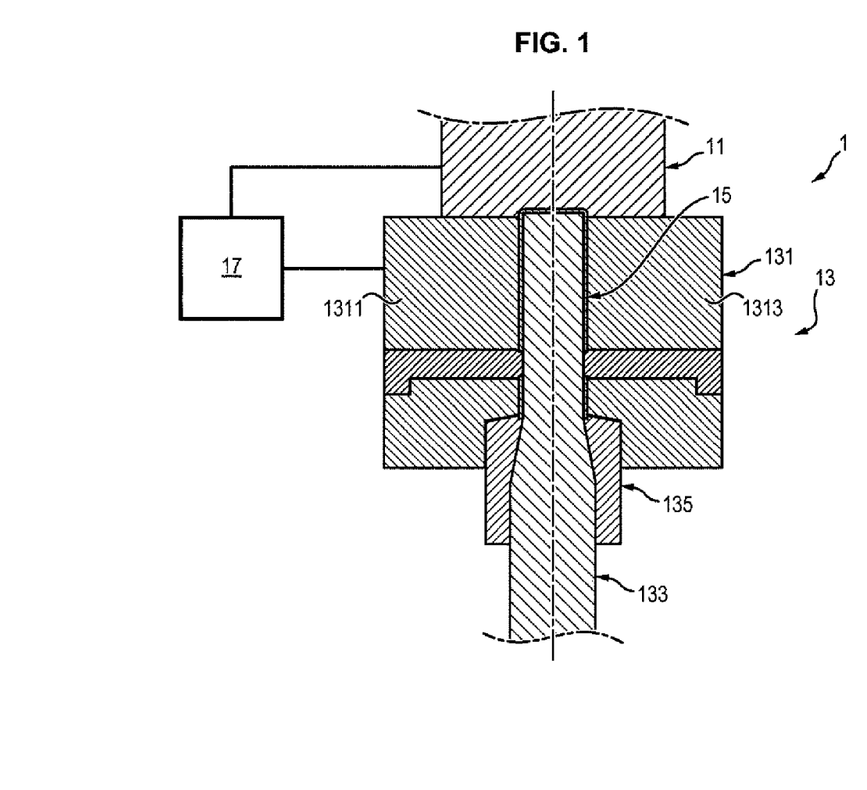
FIGS. 1 to 5 represent an example of different positions of a system or during a method according to an example of embodiment of the invention.

With reference to FIG. 1, the injection portion 11 is suitable for injecting material into the closed mould 13, for example so as to form at least one part 15 when the injection portion 11 is connected to the closed mould. The system 1, for example the control unit 17, is suitable for implementing such an injection.

Figure 2:
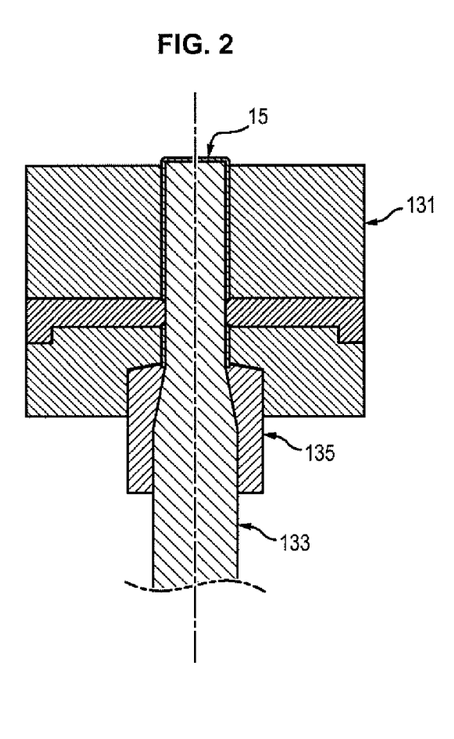

With reference to FIG. 2, the system 1, for example the control unit 17, can be suitable for moving the injection portion 11 relative to the mould 13 after injection, the outer portion of the mould 13 being held in contact with the injection-formed part to cool the part upon moving the injection portion 11.

Unlike prior art wherein the mould opens at least partially at the outer portion after the end of injection and as soon as the part begins to move relative to the injection portion, it is thus possible to pursue cooling the part the outer portion of the mould which does not normally remain in contact with the part. This therefore enables a more efficient cooling and which can therefore be stopped earlier in the complete injection cycle, thus shortening the total cycle time and thus enabling quicker succession of the cycles. In particular, this intensive cooling from start enables the portion(s) of the mould which normally remain(s) a long time in contact with the part, for example an inner portion such as described hereafter, to be released more quickly, and cooling of this/these mould portion(s) to be begun earlier for next cycle. This reduction in the cycle time enables productivity of the system to be highly increased.

The movement of the injection portion 11 is for example a release, for example a partial release or a total release, for example a movement for moving the injection portion 11 away from the mould 13, for example interrupting a fluid connection between the injection portion 11 and the mould 13.

The movement is for example a movement of the injection portion 11, the mould 13, in particular the outer portion and/or inner portion of the mould, remaining stationary, or a movement of the mould 13, in particular of the outer portion and/or inner portion of the mould, the injection portion 11 remaining stationary, or movements of the mould 13, in particular of the outer portion and/or inner portion of the mould, and of the injection portion 11 so as to have a relative motion between the mould 13, for example the outer portion, and the injection portion 11.

Mould

With reference to FIG. 2, the system 1, for example the control unit 17, can be suitable for moving the injection portion 11 relative to the mould 13 after injection, the mould 13 remaining closed upon moving the injection portion 11.

Unlike prior art where the mould opens at least partially at the outer portion after the end of the injection and as soon as the part is moved relative to the injection portion, it is thus possible to pursue cooling of the part by the portion(s) of the mould which does/do not normally remain in contact with the part. This therefore enables a more efficient cooling and which can be stopped earlier in the complete injection cycle, thus shortening the total cycle time In particular, this intensive cooling from start enables the portion(s) of the mould which normally remain(s) a long time in contact with the part, to be released more quickly, and therefore cooling of this portion of the mould to be begun earlier for next cycle. This reduction in the cycle time enables productivity of the system to be highly increased.

The mould 13 can comprise one or more portion(s), for example several portions for forming the cavity(ies) of the mould, that is the moulding portion(s) of the mould. Each moulding portion is for example in contact with at least one other moulding portion when the mould is closed, for example so that each moulding portion is in contact with each other moulding portion, directly or indirectly through one or more other moulding portion(s). The mould 13 is for example a multi-cavity mould.

The mould is for example a metal mould.

The mould 13 can comprise the mould outer portion 131. The outer portion 131 is for example suitable for extending around the part 15 and/or delimiting and/or defining an outer surface of the part 15 in the mould, for example after injection.

The system can comprise several such outer portions 131.

By outer surface, it is meant an outwardly facing surface relative to the part. By inner surface, it is meant an inwardly facing surface relative to the part.

The outer portion 131 is for example held in contact with the injection-formed part 15, to cool the part 15 when the mould 13 remains closed upon moving the injection portion. The system 1, for example the control unit 17, is for example suitable for implementing such a contact holding.

It is thus possible to pursue initial cooling of the part 15 by the outer portion 131. This cooling is all the more efficient that the contact surface area between the outer portion 131 and the part 15 is large, and/or that the outer portion 131, due to its positioning with respect to the part 15, is cooled more efficiently and/or disperses heat from the part 15 more easily. This results in more efficient initial cooling, and therefore quicker solidification, thus enabling cooling to be stopped earlier in the cycle, at least by one or more other portion(s) of the mould, thus enabling them to be cooled for next cycle.

The outer portion 131 for example comprises several sub-portions, for example two sub-portions 1311 and 1313, a first sub-portion 1311 and a second sub-portion 1313, for example movable relative to each other. Sub-portions are for example slides or shells.

The outer portion 131 can comprise protrusions enabling undercuts and/or holes of the part 15 to be formed. The mould 13 is for example configured so that the protrusions of the outer portion 131 are in contact with an inner portion 133 such as described hereafter when the mould 13 is closed.

The outer portion 131 can comprise a cooling device. The cooling device for example comprises a cooling circuit, for example for circulating a cooling liquid, the cooling circuit possibly comprising one or more cooling channels, one or more of the one or more cooling channels for example extending within or around the outer portion 131. The cooling device can comprise conduction cooling means, for example a heat pipe.

The mould 13 can comprise a mould inner portion 133. The inner portion 133 for example forms a core or pin. The inner portion is for example suitable for extending in and/or forming and/or delimiting and/or defining a cavity of the part 15 in the mould, for example after injection. The inner portion 133 is for example suitable for extending within the part 15 and/or delimiting and/or defining an inner surface of the part 15 in the mould, for example after injection.

The system can comprise several such inner portions 133.

The inner portion 133 and the outer portion 131 are for example in contact with each other when the mould 13 is closed.

The inner portion 133 is for example held in contact with the injection-formed part 15 to cool the part 15 when the mould 13 remains closed upon moving the injection portion 11. The system 1, for example the control unit 17, is for example suitable for implementing such a contact holding.

It is thus possible, in an initial phase, to perform a pursued cooling both by the inner portion and the outer portion, so as to efficiently cool the part and then enable release of the inner portion at an earlier stage than in prior art.

The inner portion 133 can comprise a cooling device. The cooling device can comprise conduction cooling means, for example a heat pipe. The inner portion 133, for example the core or pin, can comprise a heat pipe-forming thermal conducting core therewithin.

The outer portion 131 and inner portion 133 are for example configured to contact each other when the mould is closed, for example at a connecting surface called a parting surface.

The system 1, for example the control unit 17, is for example configured so as to enable the opening of the mould 13, for example subsequently to moving the injection portion 11. The system 1, for example the control unit 17, is for example suitable for implementing such an opening.

Figure 3:
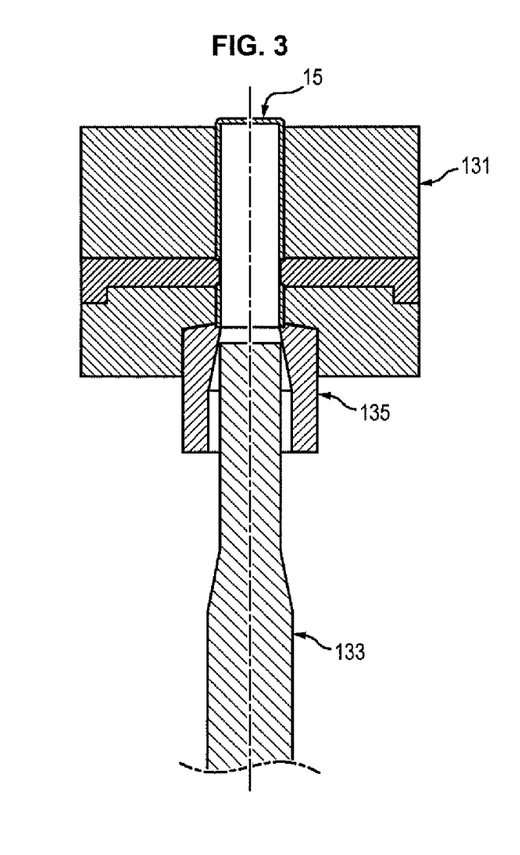

With reference to FIG. 3, opening the mould 13 for example comprises releasing, for example completely releasing or partially releasing an inner portion 133 of the mould, for example so as to enable the inner portion 133 to be cooled. Opening the mould 13, for example comprises releasing the outer portion 131 of the mould, for example when the part 15 has reached a state where the outer portion 131 and/or the inner portion 133 are no longer necessary for holding the part in shape.

Completely or partially releasing the inner portion 133 for example comprises unsecuring the inner portion 133 and outer portion 131 from each other, for example moving back the inner portion 133, for example unsecuring the inner portion and the part 15.

Releasing of the outer portion 131 for example comprises moving back the outer portion 131. Releasing the outer portion 131 for example comprises releasing, for example moving back, for example relatively moving away, the sub-portions 1311 and 1313.

The system 1 can comprise a wedge, for example a movable wedge, suitable for being held in contact with the part 15, for example so as to hold the part 15 in position, for example so as to avoid that the part 15 remains in contact with the outer portion 131, for example from remaining in contact with the sub-portion 1311 and/or sub-portion 1313. It is thus possible to further improve release of the outer portion 131. The movable wedge is for example configured to remain in contact with the part 15 until most, for example more than 50% of the outer surface area of the part 15 which is in contact with the outer portion 131 when the mould 13 is in a closed position, is no longer in contact with the outer portion 131.

The system 1, for example the control unit 17, is for example configured so that releasing the outer portion 131 begins at the same time as or subsequently to releasing the inner portion 133. Thus, as compared with prior art, releasing the inner portion 133 takes place earlier in the cycle, which enables the inner portion 133 to begin or perform its own cooling earlier and more efficiently, and therefore to complete it earlier in the cycle, enabling the cycle to be shortened as compared with prior art and therefore the new cycle to be started earlier.

Figure 4:
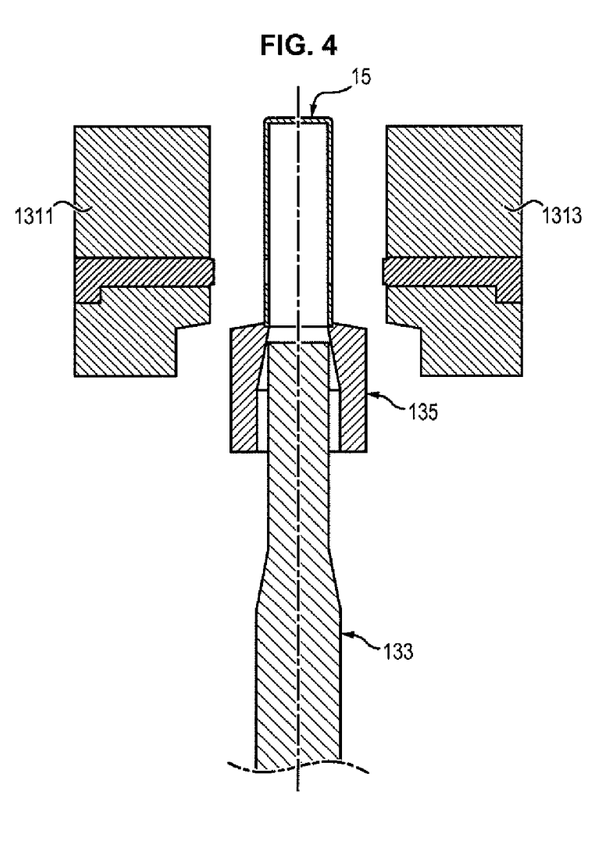

With reference to FIG. 4, the system 1, for example the control unit 17, is for example configured so that releasing the outer portion 131 begins subsequently to releasing the inner portion 133, for example so as to enable the inner portion to be cooled while the part continues to be cooled by the outer portion 131 which is held in contact with the part 15, for example subsequently to beginning the release of the inner portion 133 or once the inner portion 133 is entirely released from the part 15. The release of the outer portion 131 is for example automatically controlled so that it no longer depends on simultaneous opening the mould by releasing the inner portion 133. It is thus possible to further advance beginning of the cooling of the inner portion 133, the cooling of the part 15 being then left to the outer portion 131. Such a configuration contradicts incentives of prior art which teaches to do the opposite, that is to release beforehand the outer portion and to hold the inner portion in place for a longer time, for fear that the part should not hold its shape—but here initially holding the outer portion upon moving the injection portion, and the fact that the inner portion is able to be sufficiently cooled during the previous cycle, enable an initial cooling of the part which is sufficiently efficient not to hold it without the inner portion.

Releasing the inner portion 133 and/or outer portion 131 is for example implemented by moving the inner portion 133, the outer portion 131 remaining stationary, or moving the outer portion 131, the inner portion 133 remaining stationary, or moving the outer portion 131 and the inner portion 133 so as to have a relative motion between the outer portion 131 and the inner portion 133.

The system 1, for example the control unit 17, is for example configured so that release of the outer portion 131 is slower than release of the inner portion 133. It is thus possible to perform release of the outer portion 131 like the inner portion 133 relatively early while maintaining the outer portion 131 closer to the part so as to limit and/or prevent an undesired deformation of the part due to the part being held for a longer time by the outer portion 131, the inner portion 133 being nevertheless able to begin to be cooled.

The release speed of the outer portion 131 can thus be slower than the release speed of the inner portion 133. The release speed of the outer portion 131 can be lower than the release speed of the inner portion 133 by at least 50%, for example at least 60%, for example at most 90%. The release speed of the outer portion 131 can be between ½ and ⅐ the release speed of the inner portion 133, for example between ⅓ and ⅕. The release speed is for example the speed for moving away the outer portion 131 or inner portion 133 from the part 15.

The release speed of the outer 131, respectively inner 133 portion, is for example a mean release speed of the outer 131, respectively inner 133, portion, for example for the whole step of releasing the outer 131, respectively inner 133 portion. Alternatively or additionally, the release speed is for example the instant release speed.

Preferably, when the system 1, for example the control unit 17, is configured so that the release of the outer portion 131 is slower than the release of the inner portion 133, as described above, the system 1, for example the control unit 17, is for example configured so that releasing the outer portion 131 begins at the same time as releasing the inner portion 133. It is thus possible to limit and/or avoid an undesired deformation of the part due to the part being held for a longer time by the outer portion 131, the inner portion 133 being nevertheless able to begin to be cooled.

The system 1, for example the mould 13, can comprise an ejection portion 135.

Figure 5:
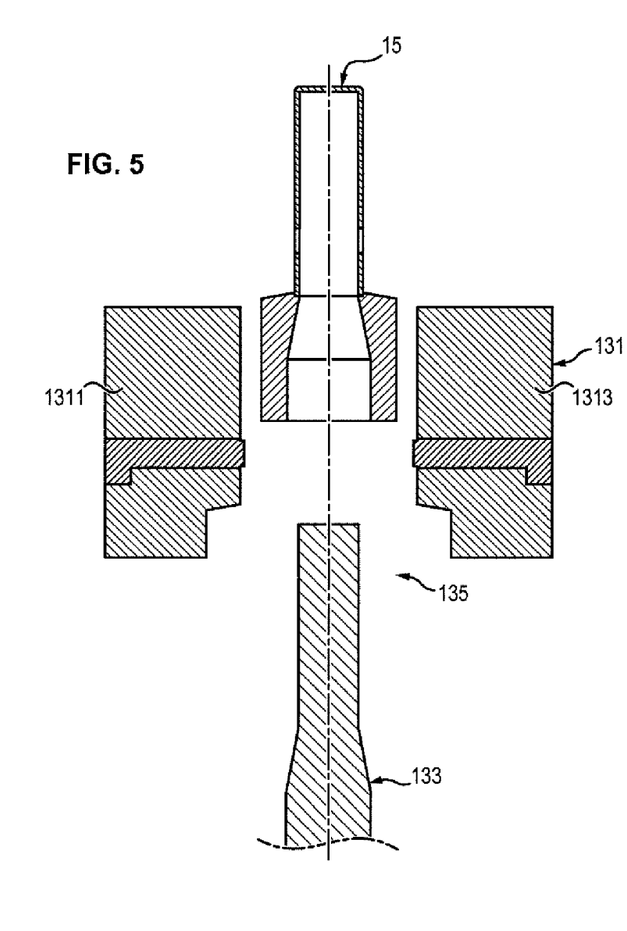

With reference to FIG. 5, the ejection portion 135 is for example suitable for participating in ejecting the part at the end of the cycle. Ejection is for example performed by pressing the part against the ejection portion 135, which is for example being moved. The system 1, for example the control unit 17, is for example configured so as to implement the ejection subsequently to releasing the inner portion 133 and/or the outer portion.

The ejection portion 135 is for example part of the mould 13. The ejection portion 135 is for example a moulding portion.

The ejection portion 135 for example has an annular or tubular shape. The ejection portion 135 is for example a wedge.

The system can comprise several such ejection portions 135.

Part

Figure 6A:
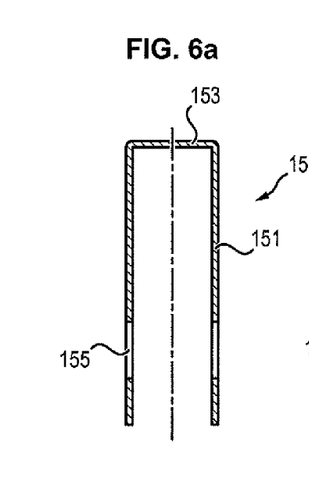
FIGS. 6a and 6b represent examples of parts from the system or the method according to an example of embodiment of the invention.
Figure 6B:
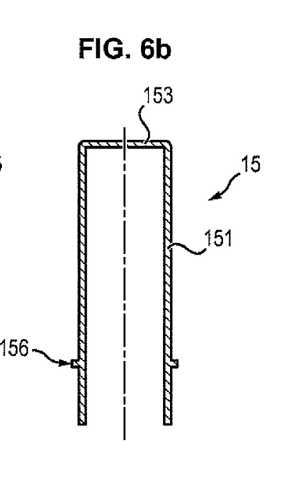

With reference to FIGS. 6a and 6b, examples of the part 15 are described.

The part 15 for example has at least one thin wall. For example all the walls of the part 15 are thin. By thin, it is meant for example a thickness lower than 3 mm, in particular lower than 2 mm, in particular lower than or equal to 1.5 mm, in particular greater than or equal to 0.5 mm, in particular between 0.5 mm and 1.5 mm.

The part 15 for example has a length greater than 3 mm, for example greater than or equal to 5 mm, for example lower than 12 mm, for example lower than or equal to 10 mm, for example between 5 and 10 mm.

The part 15 for example has or comprises a tubular shape. The part 15 for example comprises at least one tube-shaped portion. The part for example comprises at least one side wall 151, for example defining a tube, for example a cylindrical wall. The part for example comprises an end wall 153 disposed at one end of the side wall, for example so as to form a bottom of the part.

The part for example comprises one or more holes 155, for example one or more through holes, for example side holes, for example disposed at the side wall 151. The holes 155 are for example disposed at a same height of the side wall 151, for example opposite two by two.

The part for example comprises one or more bosses 156, for example one or more undercuts, for example one or more protrusions, for example one or more gadroons, for example lateral bosses, for example disposed at the side wall 151. The boss(es) 156 is/are for example disposed at a same height of the side wall 151, for example at a periphery of the part. The boss can thus form a protruding annular boss extending over 360°.

The part 15 comprises or consists of at least one thermoplastic or polymeric material. The thermoplastic and/or polymeric material for example is or comprises an amorphous thermoplastic polymer, having a non-organised structure, for example polystyrene (PS), poly(methyl methacrylate) (PMMA), polycarbonate (PC) and/or a thermoplastic elastomer (TPE), for example a styrenic copolymer-based thermoplastic elastomer (TPS), for example polystyrene-b-poly(ethylene-butylene)-b-polystyrene (SEBS). The thermoplastic and/or polymeric material for example is or comprises a crystalline thermoplastic polymer, having an organised structure, for example in which polymer chains are aligned, for example polypropylene (PP) and/or polyethylene (PE).

The part 15 is for example intended for the pharmaceutical or medical field, for example for pharmaceutical or medical use, the part being for example a needle shield, for example such a shield for a prefilled syringe and/or a drug auto-injection pen. The part is for example intended for the cosmetic field and/or use, the part being for example a cap or tube. The part is for example intended for the food field and/or use, the part being for example a cap. The part is for example intended for the field and/or a use specific to consumer product, the part being for example a portion of a pen, for example a pen cap.

In particular, in fields where contamination of parts in particulate and/or microbiological terms has to be controlled, the system and the method described herein enable the exposure time of parts and number of handling operations during manufacturing thereof to be limited as much as possible.

The system 1 can enable several parts to be manufactured in parallel or series. In this case, the system can comprise several injection portions 11 and/or several moulds 13 and/or several ejection portions and/or the mould 13 can comprise several inner portions 133 and/or several outer portions 131 and/or several ejection portions 135, each operating as described herein with respect to a given part 15.

Figure 7A:
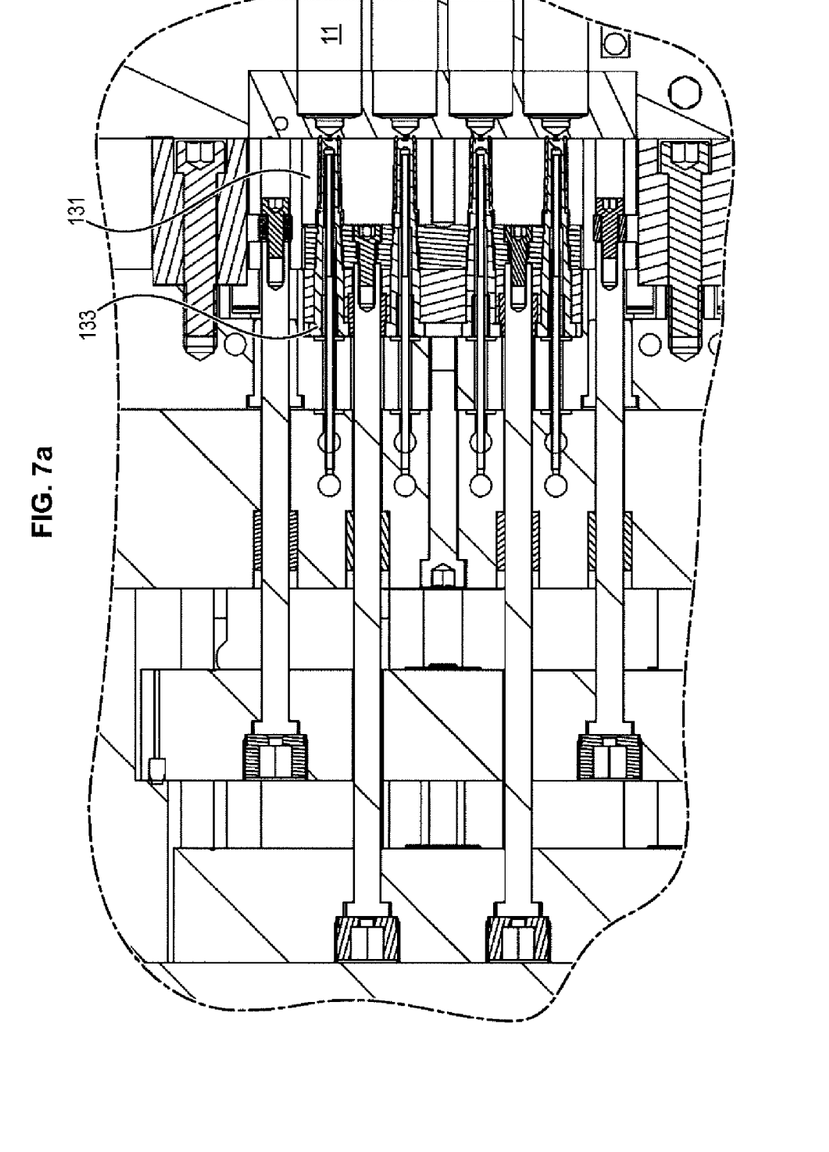
FIGS. 7a, 7b and 8 represent different positions of a system or during a method according to an example of embodiment of the invention.
Figure 7B:
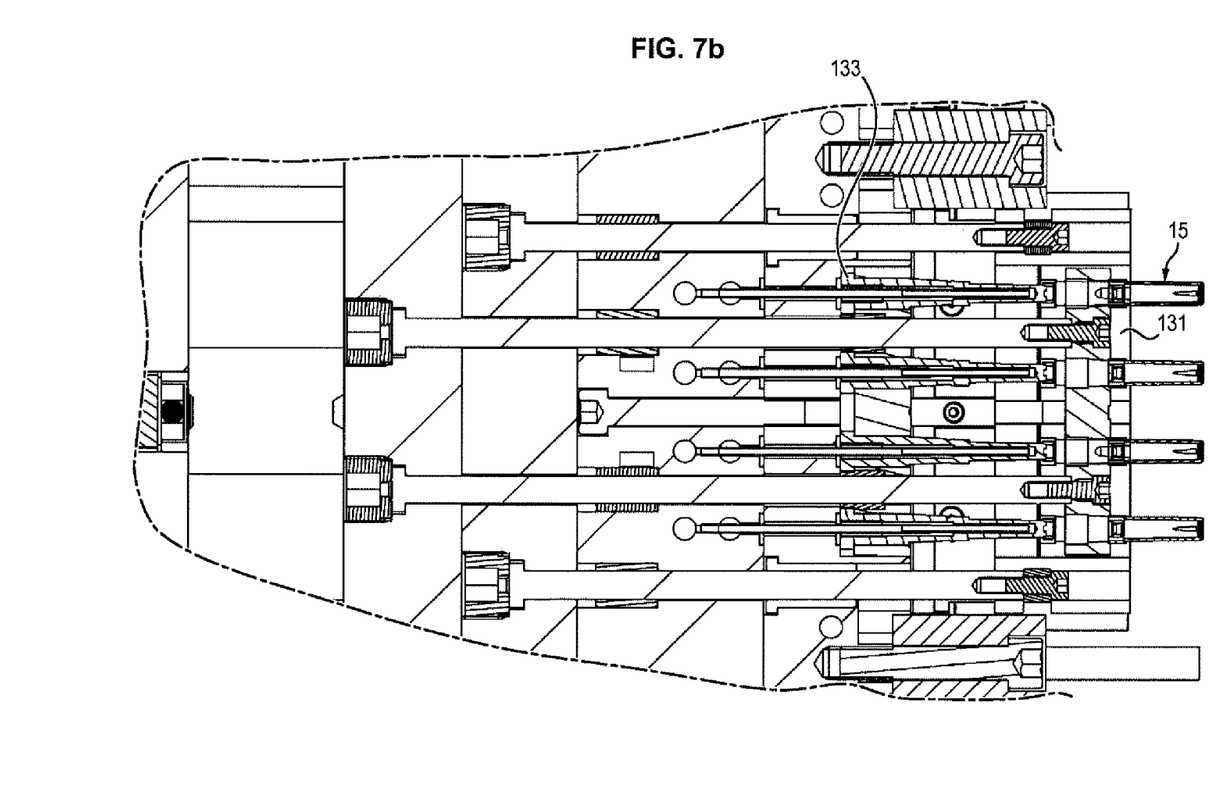
Figure 8:
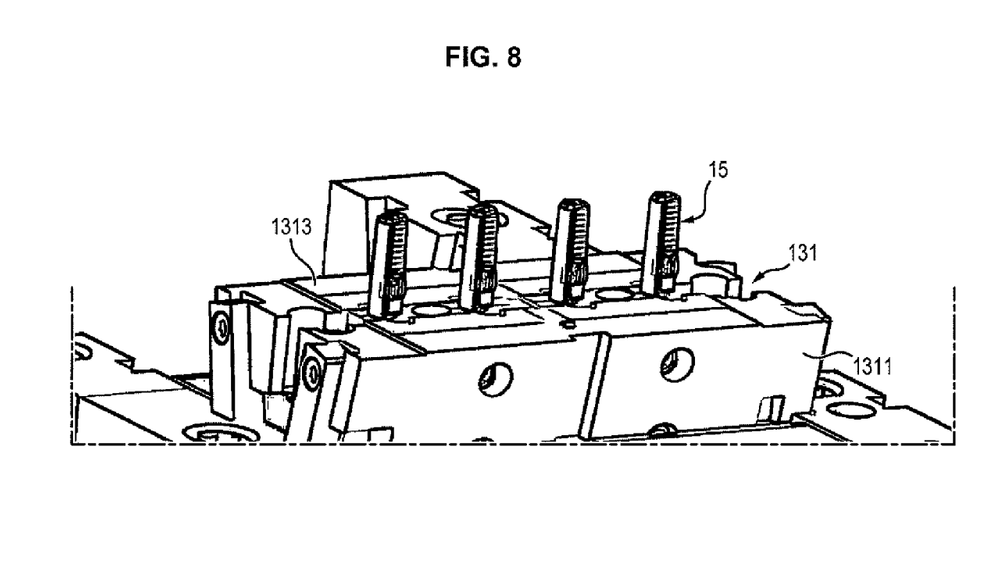

With reference to FIGS. 7a, 7b and 8, a system 1 such as described herein is described, for example for implementing a method such as described hereafter. The system 1 can comprise a plurality of injection portions 11, for example connected to each other, for example stationary relative to each other. The system 1 can comprise a plurality of inner portions 133, for example connected to each other, for example stationary relative to each other. A plurality of outer portions 131, for example a plurality of pairs of sub-portions 1311 and 1313, the first sub-portions 1311 being stationary relative to each other and/or the second sub-portions 1313 being stationary relative to each other.

Control Unit

The control unit 17 for example comprises computational and/or information processing means, for example a processor. The control unit 17 for example comprises a read only or random access memory, for example connected to the processor, storing instructions allowing the provided configurations of the system and for which the structure of the system is configured and/or to store instructions corresponding to the method described hereafter.

Method

Figure 9:
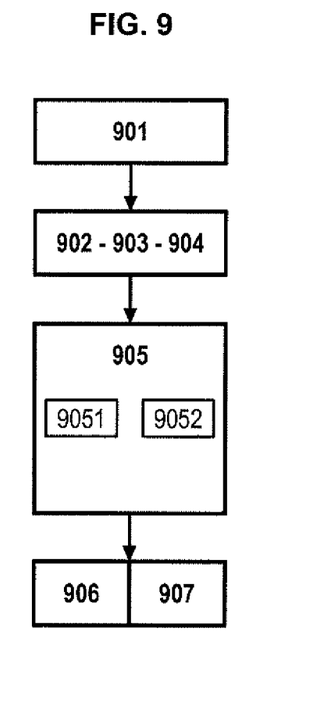
FIG. 9 represents a method according to an example of embodiment of the invention.

With reference to FIG. 9, a method for manufacturing polymer parts is described.

The method is for example implemented by means of the system 1 for manufacturing polymer parts, for example the system 1 described hereinabove.

The characteristics set forth with respect to the system can therefore be applied to the method and vice versa. In particular characteristics of the system can be applied to the method, for example as steps, and vice versa.

The method can comprise a step 901 of injecting material by an injection portion, for example the injection portion 11, into a mould, for example the closed mould 13, for example so as to form at least one part 15, the injection portion being connected to the closed mould. Such a step is for example illustrated in FIG. 1.

Injection is for example hot injection, for example plasticised and/or molten material injection.

The method can comprise, after injection, a step 902 of moving the injection portion relative to the mould, an outer portion of the mould 13 being held in contact with the injection-formed part to cool the part upon moving the injection portion. Such a step is for example illustrated in FIG. 2.

Moving the injection portion 11 is for example releasing, for example partially releasing or totally releasing, for example moving enabling the injection portion 11 to be moved away from the mould 13, for example interrupting a fluid connection between the injection portion 11 and the mould 13.

Moving is for example moving the injection portion 11, the mould 13, in particular the outer portion and/or inner portion of the mould, remaining stationary, or moving the mould 13, in particular the outer portion and/or inner portion of the mould, the injection portion 11 remaining stationary, or moving the mould 13, in particular the outer portion and/or inner portion of the mould, and the injection portion 11 so as to have a relative motion between the mould 13, for example the outer portion, and the injection portion 11. Moving is for example backwardly moving, for example backwardly moving the outer portion and/or mould 13, driving the part, relative to the injection portion 11, which is for example stationary.

Unlike prior art where the mould opens at least partially at the outer portion after the end of the injection and as soon as the part begins to move relative to the injection portion, it is thus possible to pursue cooling by the outer portion of the mould which does not normally remains in contact with the part. This therefore enables a more efficient cooling which can therefore be stopped earlier in the complete injection cycle, thus shortening the total cycle time and thus enabling quicker succession of cycles. In particular, this intensive cooling from the start enables the portion(s) of the mould which normally remain(s) for a longer time in contact with the part, for example an inner portion such as described hereafter, to be more quickly released, and cooling this or these mould portion(s) to be begun earlier for the following cycle, and therefore the effective cooling time of these portions to be increased between two cycles. This reduction in the cycle time enables productivity of the method to be highly increased.

The method can comprise, after injection, a step 902 of moving the injection portion relative to the mould, the mould remaining closed and/or an outer portion of the mould 13 being held in contact with the injection-formed part. Such a step is for example illustrated in FIG. 2.

Moving is for example moving the injection portion 11, the mould 13 remaining stationary, or moving the mould 13, the injection portion 11 remaining stationary, or moving the mould 13 and the injection portion 11 so as to have a relative motion between the mould 13 and the injection portion 11. Moving is for example backwardly moving, for example backwardly moving the mould 13, driving the part, relative to the injection portion 11, which is for example stationary.

Unlike prior art where the mould opens at least partially after the end of the injection and as soon as the part begins to move relative to the injection portion, it is thus possible to pursue cooling of the part by the portion(s) of the mould which does/do not normally remain in contact with the part. This therefore enables a more efficient cooling and which can therefore be stopped earlier in the complete injection cycle, thus shortening the total cycle time and thus enabling quicker succession of the cycles. In particular, this strong cooling from the start enables the portion(s) of the mould which normally remain(s) a long time in contact with the part to be more quickly released, and cooling of this mould portion to be begun earlier for next cycle, therefore, the effective cooling time of these portions to be increased between two cycles. This reduction in the cycle time enables productivity of the method to be highly increased.

The mould can comprise the mould outer portion, for example the outer portion 131.

The method can comprise a step 903 of holding the outer portion 131 in contact with the injection-formed part 15, for example during step 901, to cool the part 15 when the mould 13 remains closed upon moving the injection portion 11 of step 902.

It is thus possible to pursue the initial cooling of the part 15 by the outer portion 131. This cooling is all the more efficient that the contact surface area between the outer portion 131 and the part 15 is large, and/or that the outer portion 131, due to its positioning with respect to the part 15, is cooled more efficiently and/or disperses heat produced from the part 15 more easily. This results in a more efficient initial cooling, thus enabling cooling to be stopped earlier in the cycle, at least by one or more other portion(s) of the mould, thus enabling them to be cooled for next cycle.

The method can comprise a step 905 of opening the mould 13. Opening the mould 13 is for example at least partially performed while solidification of the part 15 is not completed, for example while surface solidification of the part is not completed, for example before it is not possible to handle the part, for example through the ejection portion.

Step 905 can comprise a step 9051 of releasing, for example partially releasing or totally releasing, an inner portion of the mould, for example the inner portion 133, for example so as to enable the inner portion 133 to be cooled. Such a step is for example illustrated in FIG. 3.

Step 9051 is for example implemented, or begins, before the outer portion 131 is released. Thus, unlike prior art, opening can take place while the part is only weakly solidified, while handling it is not yet possible.

Step 905 can comprise a step 9052 of releasing the outer portion 131. Such a step is for example illustrated in FIG. 4.

Step 9052 can comprise contacting the part 15 by the wedge, for example the movable wedge, for example so as to hold the part 15 in position, for example so as to avoid that the part 15 remains in contact with the outer portion 131, for example from remaining in contact with the sub-portion 1311 and/or sub-portion 1313. It is thus possible to further improve release of the outer portion 131. The movable wedge can remain in contact with the part 15 until most, for example more than 50% of the outer surface area of the part 15 which is in contact with the outer portion 131 when the mould 13 is in the closed position, is no longer in contact with the outer portion 131.

The method is for example such that step 9052 of releasing the outer portion 131 begins at the same time as step 9051 of releasing the inner portion 133, or begins after step 9051 of releasing the inner portion 133. Thus, as compared with prior art, releasing the inner portion 133 takes place earlier in the cycle, which enables the inner portion 133 to begin or perform its own cooling earlier and more efficiently, and therefore to complete it earlier in the cycle, enabling the cycle to be shortened as compared with prior art and therefore to the new cycle to begin earlier. Releasing the inner portion 133 for example comprises backwardly moving the inner portion relative to part 15.

The method is for example such that step 9052 of releasing the outer portion 131 begins after step 9051 of releasing the inner portion 133, for example so as to enable the inner portion 133 to be cooled while the part 15 continues to be cooled by the outer portion 131. In particular, step 9052 of releasing the outer portion 131 can begin subsequently to beginning the release of the inner portion 133 or once the inner portion 133 is entirely released from the part 15. It is thus possible to further advance beginning of cooling of the inner portion 133, cooling the part 15 being then left to the outer portion 131. It is thus possible to maximise the contact time of the outer surface of the part with the outer portion 131, that is maximise cooling via the largest exchanging surface area by means of the best cooled moulding portion. Such a configuration contradicts incentives of prior art which teaches to do the opposite, that is to release beforehand the outer portion and hold the inner portion in place for a longer time, for fear that the part should not hold its shape—but here the initial holding of the outer portion upon moving the injection portion, and the inner portion being able to be sufficiently cooled during the previous cycle, enable a sufficiently efficient initial cooling of the part not to hold it without the inner portion.

Thus, ejection can take place as late as possible without delaying the cycle, by maximising cooling of the part 15 by the outer portion 131 while enabling the inner portion 133 to be cooled in parallel.

Step 9052 of releasing the outer portion 131 can be slower than the step of releasing the inner portion 133. It is thus possible to perform release of the outer portion 131 like the inner portion 133 relatively early while holding the outer portion 131 closer to the part so as to limit and/or avoid an undesired deformation of the part due to the part being held longer by the outer portion 131, the inner portion 133 being nevertheless able to begin to be cooled.

The release speed of the outer portion 131 can thus be slower than the release speed of the inner portion 133. The release speed of the outer portion 131 can be lower than the release speed of the inner portion 133 by at least 50%, for example at least 60%, for example at most 90%. The release speed of the outer portion 131 can be between ½ and ⅐ of the release speed of the inner portion 133, for example between ⅓ and ⅕. The release speed is for example the speed for moving the outer portion 131 or inner portion 133 away from the part 15.

The release speed of the outer 131, respectively inner 133 portion, is for example a mean release speed of the outer portion 131, respectively inner 133, portion, for example for the whole step of releasing the outer 131, respectively inner 133 portion. Alternatively or additionally, the release speed is for example the instant release speed.

Preferably, when the step 9052 of releasing the outer portion 131 is slower than the step of releasing the inner portion 133, as described above, the step 9052 of releasing the outer portion 131 can begin at the same time as the step 9051 of releasing the inner portion 133. It is thus possible to limit and/or prevent an undesired deformation of the part due to the part being held longer by the outer portion 131, the inner portion 133 being nevertheless able to begin to be cooled.

The method can comprise a step 906 of ejecting the part 15 subsequently to releasing the inner portion 133 and to releasing the outer portion 131. Ejection for example takes place by pressing an ejection portion of the system, for example the mould 13, for example the ejection portion 135, against a thickness of the part 15. Such a step is for example illustrated in FIG. 5.

The method can comprise one or more cooling steps.

After injection, while the mould is closed, the method can comprise a step of cooling injected matter by the closed mould, for example by the outer portion 131 and inner portion 133. Cooling for example takes place before the step 902 of moving the injection portion and/or during the step 902 of moving the injection portion and/or after the step 902, for example before the step 905.

After step 9051, subsequently to releasing the inner portion 133, the method can comprise a step 906 of cooling the inner portion 133 by convection, for example convection with air. The step 906 is for example at least partially implemented at the same time as the ejecting step 907 and/or the step 9052 of releasing the outer portion 131. The step 906 can further comprise cooling the inner portion 133 by conduction, for example by means of the heat pipe of the inner portion 133.

The method can comprise a step of cooling by conduction and/or by the cooling circuit, for example during one or more of steps 901 to 907.

The succession of steps described above can form a part production cycle. The method can comprise one or more cycle repetitions, for example for the series production of parts 15.

Similarly, it is described a method for successively manufacturing parts comprising several repetitions of the above-described method.

The invention claimed is:

1. A method for manufacturing polymer parts implemented by a system, the system including a material injection portion, a mould having a mould outer portion and being movable between at least an open position and a closed position, and a wedge, the method comprising:
    Injecting polymer material by the material injection portion into the mould in the closed position to form at least one part when the material injection portion is connected to the mould;
    after injecting polymer material, moving the material injection portion relative to the mould while holding the mould outer portion in contact with the part, said contact between the mould outer portion and the part enabling a cooling of the part;
    moving the mould to the open position by releasing the mould outer portion and the mould inner portion, wherein the wedge holds the part in position to avoid the part remaining in contact with the mould outer portion during releasing of the mould outer portion and the mould inner portion.

2. The method of claim 1, wherein the mould remains closed upon moving the material injection portion.

3. The method of claim 1, including releasing the mould inner portion so that the mould inner portion cools, and wherein releasing the mould outer portion begins at the same time or subsequently to releasing the mould inner portion.

4. The method of claim 1, wherein releasing the mould outer portion begins subsequently to releasing the mould inner portion so that the mould inner cools while the part continues to be cooled by the mould outer portion.

5. The method of claim 1, further comprising ejecting the part subsequently to releasing the mould inner portion and releasing the mould outer portion by pressing an ejection portion of the system against a thickness of the part.

6. The method of claim 1, wherein the release speed of the mould outer portion is lower than the release speed of the mould inner portion by at least 50%.

7. The method of claim 1, wherein the release speed of the mould outer portion is lower than the release speed of the mould inner portion by at least 60%.

8. The method of claim 1, wherein the release speed of the mould outer portion is lower than the release speed of the mould inner portion by at least 90%.

9. A method for manufacturing polymer parts implemented by a system, the system including a material injection portion, a mould having a mould outer portion and a mould inner portion and being movable between at least an open position and a closed position, the method comprising:

injecting polymer material by the material injection portion into the mould in the closed position to form at least one part when the material injection portion is connected to the mould;

after injecting polymer material, moving the material injection portion relative to the mould while holding the mould outer portion in contact with the part to cool the part; and moving the mould to the open position by:
    releasing the mould inner portion; and
    releasing the mould outer portion beginning subsequently to releasing the mould inner portion so as to allow a cooling of the mould inner portion, wherein the mould outer portion is released at a slower speed than the mould inner portion.

10. The system of claim 1, wherein the protrusions of the mould outer portion are configured to create holes and/or undercuts in the at least one part.

\* \* \* \* \*